United States Patent
Bell et al.

(10) Patent No.: US 9,376,517 B2
(45) Date of Patent: Jun. 28, 2016

(54) POLYMERISATION PROCESS

(71) Applicant: Ineos Europe AG, Vaud (CH)

(72) Inventors: Andrew David Bell, Carry-le-Rouet (FR); Pierre-Marie Cagna, Lyons (FR); Fabrice Betton, Lyons (FR); David Heslop, Istres (FR); Kevin Peter Ramsay, West Lothian (GB)

(73) Assignee: INEOS EUROPE AG, Vaud (CH)

( * ) Notice: Subject to any disclaimer, the term of this patent is extended or adjusted under 35 U.S.C. 154(b) by 9 days.

(21) Appl. No.: 14/368,397

(22) PCT Filed: Dec. 20, 2012

(86) PCT No.: PCT/EP2012/076431
§ 371 (c)(1),
(2) Date: Jun. 24, 2014

(87) PCT Pub. No.: WO2013/098197
PCT Pub. Date: Jul. 4, 2013

(65) Prior Publication Data
US 2014/0343242 A1 Nov. 20, 2014

(30) Foreign Application Priority Data

Dec. 28, 2011 (EP) .................................... 11195903

(51) Int. Cl.
*C08F 2/34* (2006.01)
*C08F 2/38* (2006.01)
*C08F 2/00* (2006.01)
*C08F 210/16* (2006.01)
*C08F 10/00* (2006.01)

(52) U.S. Cl.
CPC ............... *C08F 210/16* (2013.01); *C08F 10/00* (2013.01)

(58) Field of Classification Search
CPC ........... C08F 2/007; C08F 2/34; C08F 210/16
USPC ........................................ 526/88; 134/22.14
See application file for complete search history.

(56) References Cited

U.S. PATENT DOCUMENTS

| | | | | |
|---|---|---|---|---|
| 3,525,781 | A | * | 8/1970 | Scoggin .......................... 525/53 |
| 4,855,370 | A | | 8/1989 | Chirillo et al. |
| 5,376,742 | A | | 12/1994 | Krause |
| 5,928,612 | A | | 7/1999 | Chinh |
| 5,948,871 | A | | 9/1999 | Goode |
| 7,906,597 | B2 | * | 3/2011 | Fouarge .......................... 526/64 |
| 2002/0099152 | A1 | | 7/2002 | Wenzel et al. |
| 2004/0138057 | A1 | | 7/2004 | Wenzel |
| 2008/0108763 | A1 | | 5/2008 | Hoang et al. |

FOREIGN PATENT DOCUMENTS

| | | |
|---|---|---|
| WO | WO 99/29738 A1 | 6/1999 |
| WO | WO 00/35967 A2 | 6/2000 |
| WO | WO 00/35967 A3 | 6/2000 |
| WO | WO 01/49751 A1 | 7/2001 |
| WO | WO 03/103863 A1 | 12/2003 |
| WO | WO 2008/024517 A2 | 2/2008 |
| WO | WO 2008/024517 A3 | 2/2008 |
| WO | WO 2010/123748 A1 | 10/2010 |

* cited by examiner

*Primary Examiner* — Fred M Teskin
(74) *Attorney, Agent, or Firm* — Nixon & Vanderhye P.C.

(57) ABSTRACT

Process for the polymerization of monomer in a polymerization system having at least one component attached thereto which is flushed with a flush medium which enters the polymerization system. Initially, the component is flushed with a first flush medium, and subsequently the component is flushed with a second flush medium which differs in composition from the first flush medium. A flush gas containing monomer is used as the flush medium when the polymer production rate is above 10 Te/h.

23 Claims, No Drawings

POLYMERISATION PROCESS

This application is the U.S. national phase of International Application No. PCT/EP2012/076431 filed 20 Dec. 2012 which designated the U.S. and claims priority to European Patent Application No. 11195903.7 filed 28 Dec. 2011, the entire contents of each of which are hereby incorporated by reference.

The present invention relates to a polymerisation process, and in particular to the flushing of connections on a polymerisation reaction system.

BACKGROUND OF THE INVENTION

The polymerisation of monomer in both gas phase and slurry processes is well-known and widely operated commercially. In either case monomer, and optionally comonomer, are polymerised in the presence of a polymerisation catalyst to form the polymer.

The polymerisation reaction is highly exothermic. It is therefore important to maintain efficient cooling throughout the reaction zone, and to prevent hot-spots. This is generally achieved by maintaining strong circulation of reactants e.g. in a fluidised bed or slurry loop, and trying to avoid stagnant spots.

However, many of the connections to the reactor for feeding and withdrawing materials, and for process monitoring or control, form zones which have the potential for stagnant reaction medium. In particular, most connections comprise a valve and a line by which the valve is connected to the reactor. When the valve is closed the line between the valve and the reactor forms a zone with the potential for stagnant reaction medium. Reaction in these zones can form polymer, which may foul or block the line. Some of these connections may be linked to critical services, such as compressor seals or relief valves, which lose their effectiveness if exposed to the polymer/polymerisation reaction.

For this reason it is known to flush such zones both to prevent build-up of polymer in the zone and also to prevent contact of the polymerisation mixture with seals and the like.

This is usually done using a gas or liquid which is not harmful to the materials, such as seals, in the zone, and also which is not overly detrimental to the polymerisation reaction. Examples of suitable materials in a polymerisation process can include inert gases such as nitrogen or inert liquids such as slurry reaction diluent.

Whilst nitrogen is a useful flush gas, in that it is inert and usually readily available, an issue is that, although it does not directly affect the polymerisation, being inert it can build-up to relatively high levels, and thus needs to be purged from the system. Being of a similar molecular weight to ethylene, however, the purge often leads to losses of significant quantities of valuable materials.

SUMMARY OF THE INVENTION

We have now found that an improved process comprises using different flush mediums at different times.

Thus, the present invention provides a process for the polymerisation of monomer in a polymerisation system having at least one component attached thereto which component is flushed with a flush medium which enters the polymerisation system, wherein initially said component is flushed with a first flush medium, and subsequently said component is flushed with a second flush medium.

DETAILED DESCRIPTION OF THE INVENTION

"Polymerisation system" as used herein includes both a polymerisation reactor but also other parts of the overall apparatus in which flush points may be present. Thus, the term "polymerisation system" also includes downstream processing steps, such as degassing steps and recycle lines. The degassing steps may, for example, have compressors with seals or filters which can be flushed.

A recycle line may, and generally will, include pumps which have seals which can be flushed.

The polymerisation system may be a slurry phase polymerisation system, for example for polymerisation of an olefin monomer in one or more slurry loop reactors.

Preferably the polymerisation system is a gas phase polymerisation system, and most preferably a fluidised bed gas phase polymerisation system. The fluidised bed gas phase polymerisation system generally comprises a fluidised bed gas phase reactor, a recycle system for cooling and recycling fluidising gas exiting the reactor back to the reactor, preferably after condensation of at least some of said stream, a polymer withdrawal line, downstream processing steps including at least one degassing step for the withdrawn polymer, and at least one recycle line for separated vapour from the downstream processing steps.

The at least one component may be any component attached to the reaction system that may be flushed. The term "component" as used herein refers to a component which is relatively small compared to the pipes or vessel to which it is connected and which make up the main parts of the reaction system. One example of components which may be flushed are seals, such as pump and compressor seals.

Other examples of components are pressure relief valves, withdrawal lines, inlet lines, and instrument tappings. The "withdrawal line" for example, could be a polymer withdrawal line. The "inlet line" for example, could be a catalyst injection line or a reactant feed line. "Stand-by" or "unused" withdrawal and inlet lines are generally maintained with the manual or control valve for the line closed, and it is desired to flush the stagnant zone between the reactor and the valve.

Instrument tapping refers to a line by which an instrument is connected to the reaction system. Examples include for flow measurement, for density measurement, for compositional analysis and, preferably, for pressure measurement ("pressure tapping").

The term "flush", as used herein, refers to the use of a flow of a medium (flush medium) to keep polymer and/or polymer reaction medium away from a component.

Thus, for example, the term "component" as used herein does not encompass vessels such as reactors and purge tanks, and the term "flushing" as used herein does not encompass purging of polymer to remove absorbed hydrocarbons.

Generally, there will be multiple components within the polymerisation system which may be flushed. Although some may in themselves have only a relatively small flush flow rate, the overall flow rate of flush medium into the reaction system can be significant. For example, where nitrogen is used as a flushing medium in all such components the total flow of flushing medium which may be required may be of the order of 400-800 kg/h.

Preferably the present invention includes at least one component on the polymerisation reactor itself. Components which are usually present on the reactor itself and which are therefore preferred generally include pressure relief valves, withdrawal lines, inlet lines, and instrument tappings.

The first and second flush mediums may be any mediums which differ in composition. Usually one comprises an inert medium. However, and as long as the components are not a poison for the catalyst, the other may comprise one or more non-inert components.

As used herein "non-inert components" refers to components which react in the polymerisation system. In particular, we have found that reactive mediums can be used, and despite the reactive environment fouling of the flushed zones does not occur i.e. the flushing effect negates the potential for additional reaction due to the use of a reactive medium.

This is surprising since it might have been expected that the higher the concentration of a reactive medium at the site of potential fouling, especially monomer (or comonomer) concentration, then the higher the risk of polymerisation, and thereby fouling and/or blockage occurring.

Preferably the first and second flush mediums are first and second flush gases. In this case usually one comprises an inert gas or gases, and the other comprises one or more non-inert gases. In particular the one or more non-inert gases may be one or more gases which are normally present in the polymerisation system. Preferred examples of such gases are gases that are consumed in the reaction loop such as monomer (corresponding to the monomer which is being polymerised), comonomers (when present and when gaseous under the reaction conditions) and hydrogen. Since they are consumed accumulation of such components in the polymerisation system is not an issue.

Where the first or second flush gas comprises an inert gas it preferably comprises at least 90 wt % inert gas, especially at least 95 wt % inert gas, for example consists essentially of one or more inert gases. The preferred inert gas is nitrogen. Thus, the first flush gas preferably comprises at least 90 wt % nitrogen, especially at least 95 wt % nitrogen, and most preferably the first flush gas consists essentially of nitrogen.

Where the first or second flush gas comprises monomer it may comprise relatively pure monomer, by which is meant at least 90 wt % monomer, especially at least 99 wt % monomer. In particular, a stream of fresh monomer may be used. However, it is also possible to use a process stream comprising lower levels of monomer. Such process streams, for example as a recycle stream, are readily available, and may comprise monomer, comonomer and nitrogen.

The switch from flushing with a first flush medium to flushing with a second flush medium may be performed as a single step from one flush medium to the other. Alternatively, the change may be made in more than one step or even continuously by gradually replacing the first flush medium with the second flush medium.

Preferably the switch is performed in a single step.

The first and second flush mediums may generally be introduced at any suitable pressure, although they will generally be above the pressure at the component where they are being used to ensure effective flushing.

The present invention may be advantageously applied during process start-up, shut-down or a process upset.

In a most preferred embodiment the polymerisation system is a gas phase polymerisation system and the first and second flush mediums are first and second flush gases. The present invention will now be described with respect to such a system although it will be apparent that a number of the advantages could equally be applied in other polymerisation processes and/or with liquid flush mediums. In a first embodiment, the first flush gas comprises an inert gas, preferably nitrogen.

The second flush gas in the first embodiment preferably comprises a monomer, and in particular the monomer being polymerised.

The first embodiment of the present invention may be advantageously applied during process start-up, either from a planned or unplanned shut-down or upset.

In a start-up of a fluidised bed gas phase process, for example, a bed of polymer particles is usually fluidised prior to introduction of catalyst, and the reaction temperature increased. Prior to introduction of catalyst it is generally desired not to have too much monomer present. Once catalyst in injected then reaction starts at a controlled and relatively low level, and monomer feed rate can then be increased to increase reaction rate.

Thus, a flush comprising inert gas can be used prior to catalyst injection so that monomer does not build-up to too high a level. Once reaction has started, however, it has been found that a flush gas comprising monomer may be preferentially used. The advantage of a flush comprising monomer is that monomer is desired in the process when reaction is taking place. By minimising the introduction of nitrogen the amount that needs to be purged is minimised, and thereby so is the amount of monomer (and other valuable components) that is lost in the purge.

A further advantage of a flush comprising monomer is that since the monomer is desired in the process when reaction is taking place it is also possible to increase the flush rate without worrying about the requirement for an increased purge rate (as would be the case with an inert gas). Thus, the present invention allows to start-up with an inert flush, optionally at a relatively lower flush rate, and switch to monomer, optionally at a relatively higher flush rate, as production rate increases.

Another example of when the process of the first embodiment of the present invention may be applied is when re-starting after a process upset. In the event of an upset in which reaction must be rapidly stopped, for example a loss of cooling, it is usual to vent the reactor contents. At this stage, to prevent further hydrocarbon emissions and also to prevent a potentially flammable mixture building up again in the reaction system it has been found advantageous to switch the components which need to be flushed to flushing with an inert gas. When the process is restarted then the flushes can be switched back to monomer according to the first embodiment of the present invention.

In a second embodiment the first flush gas may comprise the monomer and the second flush may comprise an inert gas. As can be noted, this is the opposite of the first embodiment. An example of when such a process may be applied is during the shut-down of a polymerisation process, or during a process upset as described in the first embodiment.

As noted previously, the present invention may be advantageously applied during process start-up, shut-down or a process upset.

For example, preferably a flush gas comprising inert gas is used when the polymer production rate is below 5 Te/h Preferably a flush gas comprising monomer is used when the polymer production rate is above 10 Te/h As also noted above, generally, there will be multiple components within the polymerisation system which are flushed.

Although it is not necessary, the biggest benefits of the present invention are obtained when all of the components flushed with the first flush medium are subsequently switched to be flushed with the second flush medium. (It is not generally important whether they are switched simultaneously or sequentially however).

Where this is not done the biggest benefits obviously come from switching the components which have the highest flush rates. These are generally seals on pumps and compressors, which generally have relatively high flush rates per se, and instrument tapping purges, which whilst individually have relatively low flush rates, collectively can require a significant flush rate.

The process for the polymerisation of monomer in a polymerisation system may otherwise be as known in the art. For example, the monomer to be polymerised is not critical and the present invention can be applied to polymerisation of any suitable monomers. The monomer to be polymerised is preferably an olefinic monomer, and most preferably is ethylene or propylene. The monomer may be polymerised with a comonomer, which may generally be an olefin other than the monomer, and having 2 to 8 carbon atoms. Thus, where ethylene is the monomer, suitable comonomers include propylene, 1-butene, 1-hexene and 1-octene, and where propylene is the monomer, suitable comonomers include ethylene, 1-butene, 1-hexene and 1-octene.

Equally, the catalyst used for the polymerisation is not critical, and any suitable polymerisation catalyst can be used. Examples of polymerisation catalysts include those based on chromium, Ziegler-Natta catalysts and metallocene catalysts.

EXAMPLE

A fluidised bed polymerisation reaction is operated at a production rate of about 50 tonnes per hour to produce an ethylene/1-hexene co-polymer. The reaction system comprises a fluidised bed gas phase reactor, a recycle system for cooling, partially condensing the fluidising gas exiting the reactor and then recycling back to the reactor, which includes two compressors, a polymer withdrawal line with a downstream degassing step, and a recycle line for separated vapour from the degassing step, also including a compressor.

The reactor itself has 16 flushed pressure tappings and a flushed catalyst injection system.

In a comparative example, nitrogen is used for all flushes. Approximately 600 kg/h of nitrogen are introduced to the reaction system via the main loop recycle compressors, the degassing steps, the degassing recycle compressor, the pressure tappings and the catalyst injection system.

This nitrogen needs to be purged from the system, and removes with it over 450 kg/hr of ethylene.

In an example according to the invention, nitrogen is used during start-up and until the production rate is 5 Te/h, at which point the purges to the compressors and the pressure tappings are switched to ethylene.

This reduced the nitrogen purge requirement by approximately 75%, and correspondingly the amount of nitrogen lost by the process.

Further, the removal of components such as ethylene and other hydrocarbons with the nitrogen purge is reduced. This leads either to a direct reduction in the losses of such components (for example where they are flared) or to a reduction in the size of equipment to recover such components from nitrogen (for example, where ethylene is recovered using a membrane).

Another general advantage of a reduced purge rate is that ethane may build-up to a higher concentration in the reactor, high levels of ethane being generally advantageous.

The invention claimed is:

1. A process for the polymerisation of monomer in a polymerisation system having at least one component attached thereto which is flushed with a flush medium which enters the polymerisation system, wherein initially said component is flushed with a first flush medium, and subsequently said component is flushed with a second flush medium which second flush medium differs in composition from the first flush medium, and wherein a flush gas comprising monomer is used as the flush medium when the polymer production rate is above 10 Te/h.

2. A process according to claim 1 wherein the at least one component is selected from seals, pressure relief valves, withdrawal lines, inlet lines, and instrument tappings.

3. A process according to claim 1 wherein there are multiple components attached to the polymerisation system and which are flushed with a flush medium which enters the polymerisation system.

4. A process according to claim 1 wherein the at least one component is attached on a polymerisation reactor and is selected from pressure relief valves, withdrawal lines, inlet lines, and instrument tappings.

5. A process according to claim 1 wherein one of the first and second flush mediums comprises an inert medium, and the other comprises one or more non-inert components.

6. A process according to claim 1 wherein the polymerisation system is a gas phase polymerisation system.

7. A process according to claim 1 wherein the first and second flush mediums are first and second flush gases.

8. A process according to claim 7 wherein one of the first and second flush gases comprises an inert gas or gases and the other comprises one or more non-inert gases.

9. A process according to claim 8 wherein the one or more non-inert gases include monomer, comonomers and hydrogen.

10. A process according to claim 7 wherein the first flush gas comprises an inert gas.

11. A process according to claim 10 wherein the second flush gas comprises the monomer being polymerised.

12. A process according to claim 7 wherein the first flush gas comprises a monomer and the second flush gas comprises an inert gas.

13. A process according to claim 11 wherein the second flush gas comprises relatively pure monomer, by which is meant at least 90 wt % monomer.

14. A process according to claim 11 wherein the second flush gas is a process stream comprising monomer, comonomer and nitrogen.

15. A process according to claim 12 wherein the first flush gas comprises relatively pure monomer, by which is meant at least 90 wt % monomer.

16. A process according to claim 12 wherein the first flush gas is a process stream comprising monomer, comonomer and nitrogen.

17. A process according to claim 10 wherein the first flush gas comprises at least 90 wt % nitrogen.

18. A process according to claim 12 wherein the second flush gas comprises at least 90 wt % nitrogen.

19. A process according to claim 6 wherein the polymerisation system is a fluidised bed gas phase polymerisation system.

20. A process according to claim 10 wherein the first flush gas comprises nitrogen.

21. A process according to claim 1 wherein the process starts-up with a first flush medium comprising an inert medium and switches to the flush gas comprising monomer as production rate increases.

22. A process according to claim 1 wherein a flush gas comprising inert gas is used as the flush medium when the polymer production rate is below 5 Te/h.

23. A process according to claim 22 wherein the flush gas comprising an inert gas comprises at least 90 wt % nitrogen.

* * * * *